United States Patent
Heren et al.

(10) Patent No.: US 6,604,697 B1
(45) Date of Patent: Aug. 12, 2003

(54) IMPELLER DRIVEN TRAVELING SPRINKLER

(75) Inventors: Lawrence P. Heren, East Peoria, IL (US); Scott Jacobs, Bloomington, IL (US)

(73) Assignee: L. R. Nelson Corporation, Peoria, IL (US)

(*) Notice: Subject to any disclaimer, the term of this patent is extended or adjusted under 35 U.S.C. 154(b) by 99 days.

(21) Appl. No.: 09/882,799

(22) Filed: Jun. 14, 2001

(51) Int. Cl.[7] .............................. B05B 3/00; B05B 3/18
(52) U.S. Cl. ..................... 239/723; 239/722; 239/726; 239/735; 239/743; 239/744
(58) Field of Search ................... 239/723, 722, 239/726, 728, 735, 737, 741, 740, 739, 742, 743, 744, 747, 748, 754, 230, 237, 240, 251, 261

(56) References Cited

U.S. PATENT DOCUMENTS

| | | | |
|---|---|---|---|
| 3,563,569 A | * 2/1971 | Wilson | ............................ 285/5 |
| 3,628,731 A | * 12/1971 | Phillips | ....................... 239/745 |
| 3,669,355 A | * 6/1972 | Jurgens | ........................ 239/730 |
| 3,684,178 A | * 8/1972 | Friedlander | ................. 239/745 |
| 4,172,556 A | * 10/1979 | Standal | ........................... 239/1 |
| 4,181,257 A | 1/1980 | Moisan | |
| 4,204,642 A | * 5/1980 | Hunter | ....................... 239/747 |
| 4,235,379 A | 11/1980 | Beamer | |
| 4,254,912 A | 3/1981 | Lebrun et al. | |
| 4,346,842 A | 8/1982 | Botha | |
| 4,432,427 A | * 2/1984 | van der Lely | ................. 180/24 |
| 4,728,040 A | 3/1988 | Healy et al. | |
| 4,801,089 A | 1/1989 | Zeman | |
| 5,236,131 A | 8/1993 | Hayward | |
| 5,335,859 A | 8/1994 | Thayer et al. | |
| 5,711,490 A | * 1/1998 | Hansinger | ................... 239/745 |
| 6,095,432 A | 8/2000 | Casagrande | |

* cited by examiner

Primary Examiner—Davis Hwu
(74) Attorney, Agent, or Firm—Mayer, Brown, Rowe & Maw

(57) ABSTRACT

A self propelled sprinkler is disclosed. The sprinkler has a support body with a drive unit which drives two rear wheels. The drive unit is powered by water pressure supplied through a hose which is coupled to the drive unit via a hose coupler. The drive unit has a cylindrical drive chamber with circular impeller in fluid communication with the hose coupler. The impeller is rotated by the water pressure and is mechanically connected to a lateral shaft. The shaft is connected to the rear wheels. Reduction gearing from the impeller to the shaft governs the speed of the sprinkler. The reduction gearing is achieved through a series of sun gears, carrier disks and planet gears. The drive unit also has an outlet which has a socket which allows the exit of the pressurized water. The socket allows the insertion of any variety of sprinkler heads. Thus, the sprinkler allows a variety of water distribution patterns. The sprinkler is propelled by water pressure rotating the impeller and eventually the rear wheels.

19 Claims, 9 Drawing Sheets

IMPELLER DRIVEN TRAVELING SPRINKLER

FIELD OF INVENTION

This invention relates to a self propelled irrigation sprinkler. More specifically, this invention relates to an impeller driven sprinkler which traverses an area to be watered.

BACKGROUND OF INVENTION

It is often desirable to water large areas of a lawn. One common method to accomplish this aim is installation of underground pipes with sprinklers which are placed to insure that all areas of the lawn have coverage. This method is effective, however it is expensive and time consuming to install the pipes and sprinklers in the ground. Furthermore, it is difficult to change the location of sprinklers should various features of the area change.

Another inexpensive method for watering a lawn area involves using a garden hose with a sprinkler. The sprinkler is fluidly driven and distributes water in a designed geometric pattern. Examples of sprinklers include an oscillator arm sprinkler type or a spray pattern irrigation device. The garden hose is connected to a spigot which supplies water to the sprinkler under pressure. The proportion of the water flow from the spigot may be regulated by turning a knob.

A user typically connects one end of the hose to the spigot, attaches the sprinkler to the other end of the hose and places the sprinkler in the area desired to be watered. The user then turns on the water flow from the spigot by turning the knob. The water flow is forced through the hose and distributed by the sprinkler to the desired area. In this manner, areas which are distant from the spigot may be watered. By regulating the flow rate from the spigot, the user may also alter the speed of the sprinkler and the distance it throws water in the area. After the sprinkler is set up in the desired location, the user is free to attend to other tasks while the area is watered.

This method provides an inexpensive alternative to a permanent irrigation system as a user may move the sprinkler to the areas where watering is needed. However, compared to permanent irrigation systems, this method is much more labor intensive, especially for large areas. One solution which has been proposed for areas which are too large to be irrigated with one fixed sprinkler is a wheeled sprinkler which is self propelled and reels in hose as it travels across an area toward the spigot. Such a sprinkler uses the water pressure to turn a rotating sprinkler head and uses this rotational force to propel the wheels of the sprinkler. Reduction gearing connected to the sprinkler head is attached to the wheels to achieve a relatively slow speed to insure proper watering of the area. This sprinkler head has a pair of arms which rotate and discharge water at their ends thus creating coverage over a certain defined width along the path of the sprinkler. Unfortunately, such sprinklers suffer from the inability to water irregularly shaped areas since the rotating sprinkler head can only water in one circular pattern.

Thus, there exists a need for a self propelled sprinkler which allows watering of large areas using an efficient propulsion means. There also exists a need for a self propelled sprinkler which provides the use of different spray heads independent of the propulsion of the sprinkler. There is also a need for a self propelled sprinkler which follows a hose for its path.

SUMMARY OF THE INVENTION

These needs and others may be met by the present invention which is embodied in a self propelled sprinkler unit for irrigation of a ground area and connection with a hose connected to a pressurized water source. The sprinkler unit has a drive unit having a hose inlet with a hose coupler. The drive unit having a drive chamber with a rotatable impeller in fluid contact with the water flow from the hose inlet. A shaft is mechanically coupled to the impeller. The sprinkler unit has a pair of rear wheels with at least one rear wheel coupled to the shaft. An outlet coupler is in fluid communication with the drive unit. A sprinkler head is coupled to the outlet coupler.

The invention may also be embodied in a water propelled drive unit for a self propelled sprinkler with a hose coupled to a water source. The drive unit has an enclosed drive chamber with a cylindrical shape having two relatively flat ends, an outer surface, and an inner surface. An inlet coupler is located on the exterior surface of the drive chamber allowing fluid communication to the drive chamber. A shaft is mounted between the two flat ends. A rotatable impeller is mounted axially on the shaft in the drive chamber. The impeller is in fluid contact with the inlet coupler and is rotatably coupled to the shaft. An outlet coupler is mounted on the exterior surface of the drive chamber.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown in the drawings and will hereinafter be described different embodiments with the understanding that the present disclosure is to be considered as an exemplification of the invention, and is not intended to limit the invention to the specific embodiments illustrated.

Figure 1:
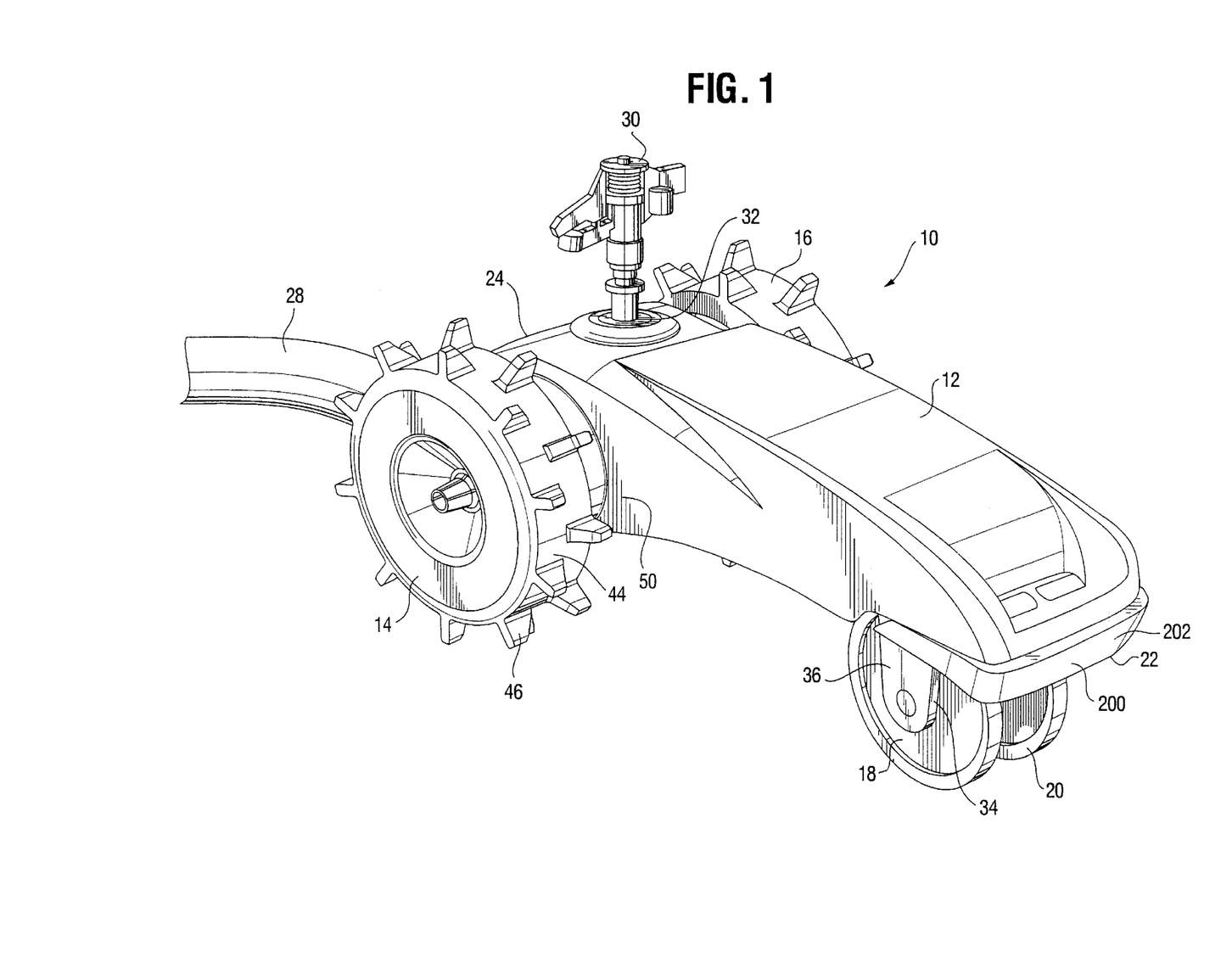
FIG. 1 is a perspective view of the traveling sprinkler according to one embodiment of the present invention.
Figure 2A:
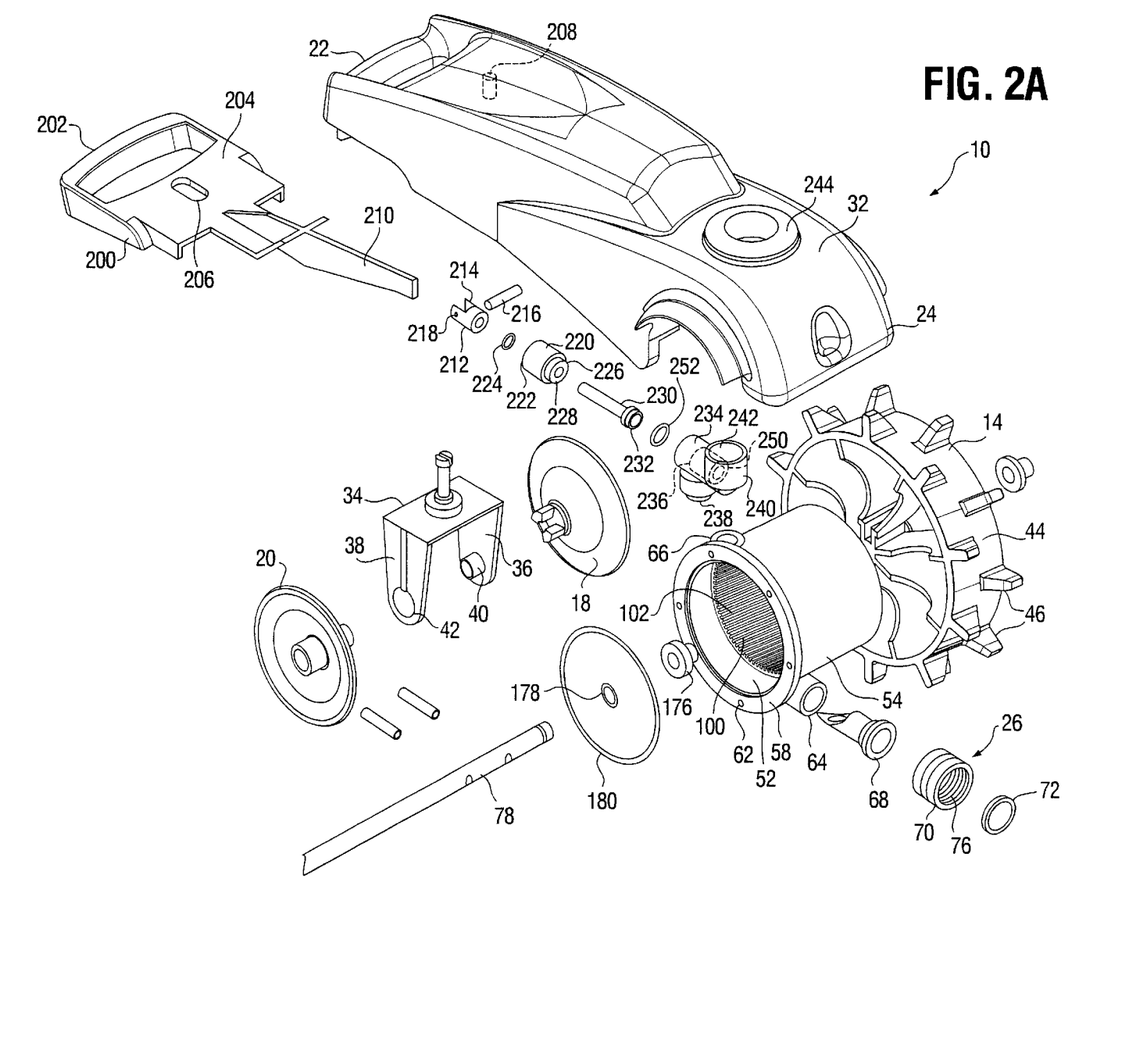
FIGS. 2A & 2B are an exploded perspective diagram of the traveling sprinkler of FIG. 1.
Figure 2B:
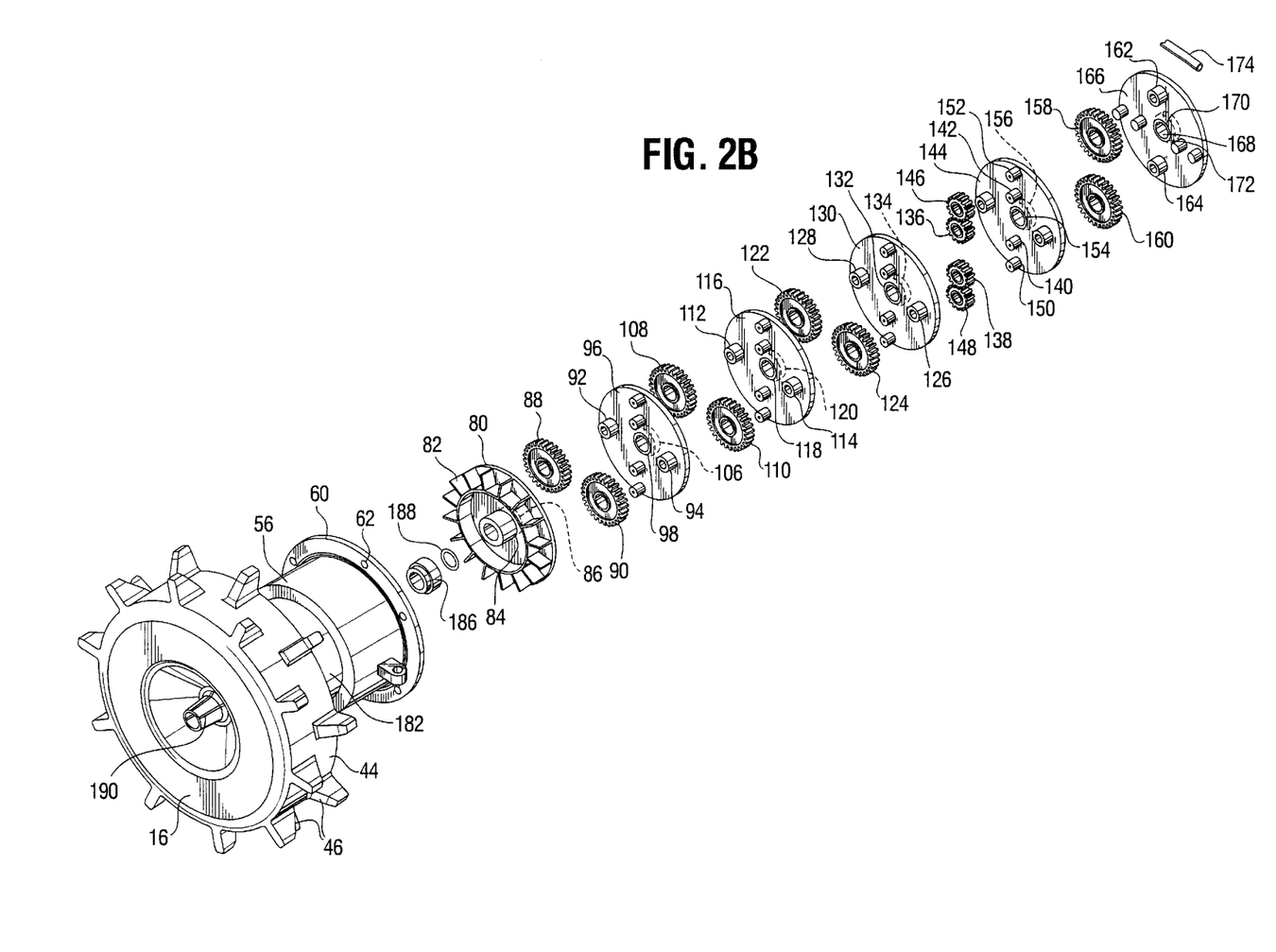
Figure 3:
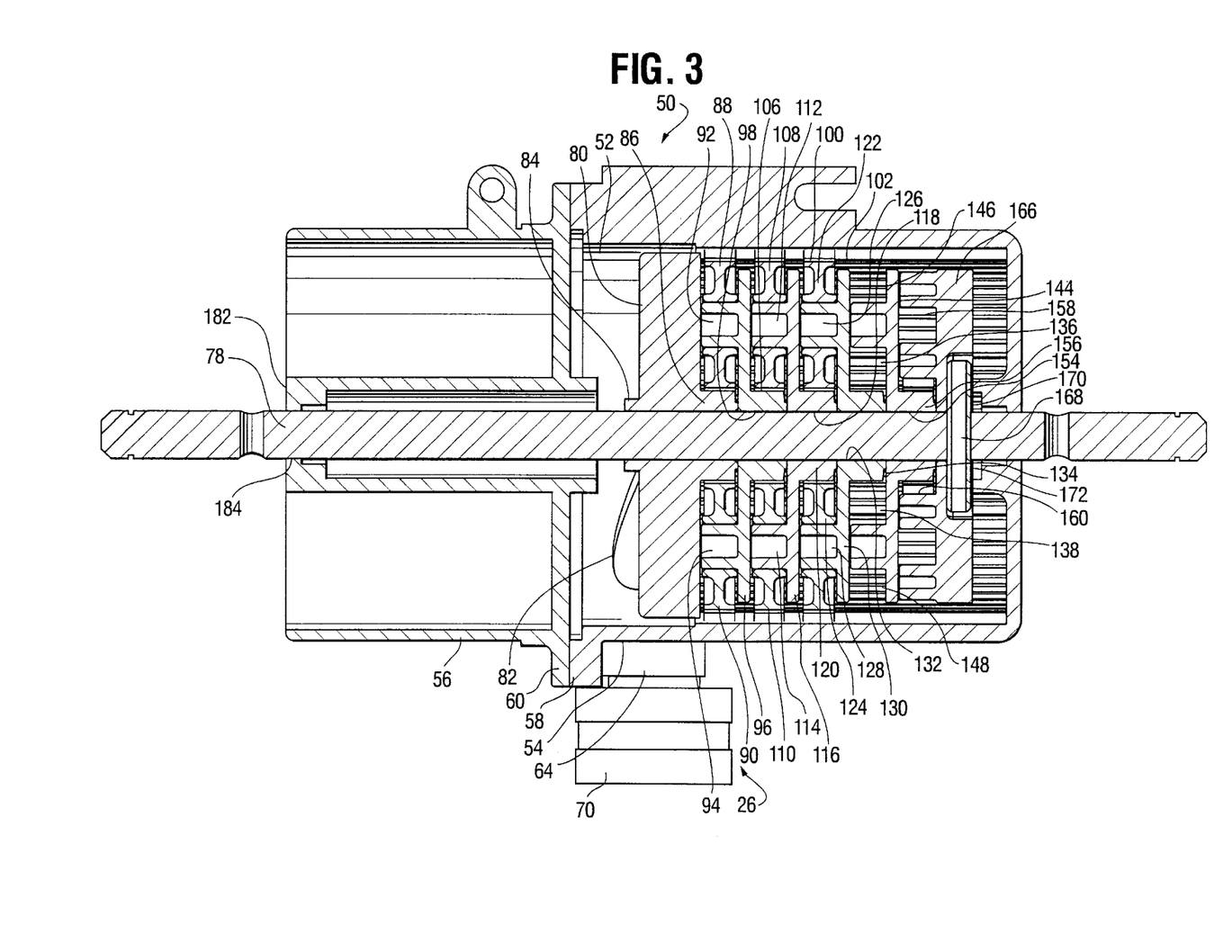
FIG. 3 is a top cutaway view of the impeller motor of the traveling sprinkler of FIG. 1.
Figure 4:
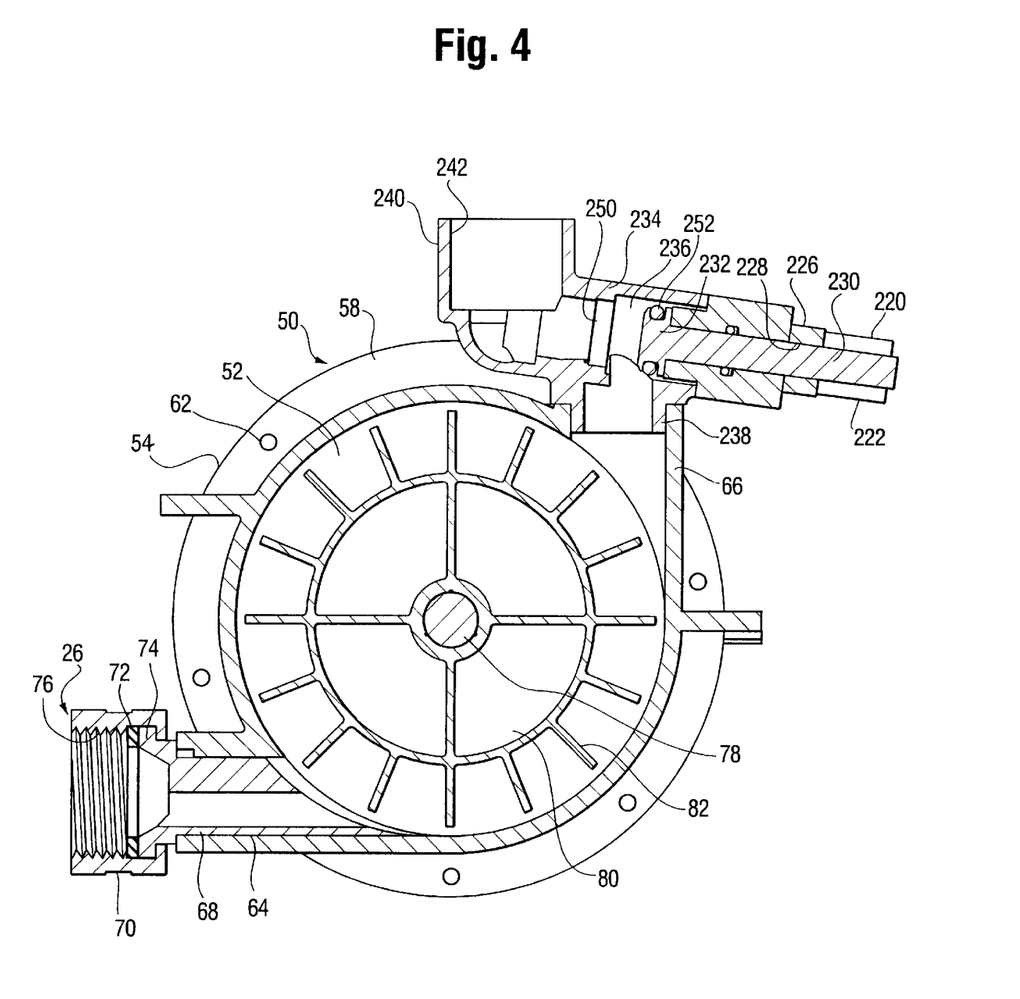
FIG. 4 is a side cutaway view of the impeller motor of the traveling sprinkler of FIG. 1.

FIG. 1 is a perspective view of a traveling sprinkler 10 and FIG. 2A and 2B are an exploded view of the parts of the traveling sprinkler 10. The traveling sprinkler 10 has a main body 12 with two large rear wheels 14 and 16 and two front wheels 18 and 20. The main body 12 is preferably fabricated from plastic although metal may be used. The main body 12 is fabricated in an aesthetically attractive shape such as in a tractor model shape in this example. Of course other shapes such as an automobile, paddle boat, spaceship etc. may be used for the main body 12. The rear wheels 14 and 16 have relatively large track width and corresponding surface contact area in order to obtain better traction. The main body 12 has a front end 22 and a rear end 24. The rear end 24 has a hose connector 26 which may be coupled to a garden hose 28 and which supplies pressurized water to the traveling sprinkler 10. A sprinkler unit 30 is mounted on a top surface 32 of the main body 12. The sprinkler unit 30 as will be explained below is an impact type sprinkler, although any other sprinkler head such as a pair of rotating arms, rotor, etc. may be used.

The front wheels 18 and 20 are mounted on a rotating clevis 34. The rotating clevis 34 has a pair of forks 36 and 38 which end in coupler sockets 40 and 42 respectively. The front wheels 18 and 20 are preferably fabricated from hard plastic which may be snapped into the forks 36 and 38. Of course other configurations such as an axle may be used for holding the front wheels 18 and 20. The rear wheels 14 and 16 are preferably made of hard plastic and have an exterior contact surface 44 with a series of nubs 46 which are molded on the contact surface 44 in order to improve traction on the ground. A water based drive unit 50 is fluidly connected to the hose 28 and provides water propulsion for the rear wheel 14 and the sprinkler head 30.

The interior of the traveling sprinkler 10 will be explained with reference to FIGS. 2A and 2B and FIGS. 3–4 which are top and side cutaway views of the drive unit 50 mounted within the main body 12. The drive unit 50 contains an interior drive chamber 52 which is formed by a pair of drive halves 54 and 56. The drive half 54 has a collar 58 and the drive half 56 has a collar 60 which both have bolt holes 62. The collars 58 and 60 are joined together via bolts to form the drive unit 50.

The drive half 54 has an inlet tube 64 which allows flow of water into the interior drive chamber 52. An outlet tube 66 allows the water to flow out of the interior drive chamber 52 and to the sprinkler unit 30. The inlet tube 64 has an inlet insert 68 which is connected to a hose adapter 70. The hose adapter 70 has a washer 72 which is seated on an annular collar 74 to provide a buffer for the hose 28. An interior surface 76 of the hose adapter 70 has female threads for coupling the hose 28 to the adapter 70. Of course other connectors such as a snap on connector may be used.

The drive unit 50 has a fixed drive shaft 78. A circular impeller 80 rotates around the fixed drive shaft 78. The impeller 80 is in mechanical connection with the shaft 78 to cause the shaft 78 to rotate as will be described below. The impeller 80 has number of impeller blades 82 mounted to its rim. The blades 82 extend from the rim of the impeller 80 to the walls of the drive chamber 52 to maximize the force exerted from the water flowing from the inlet tube 64. The impeller 80 is mounted on a bearing 84 which is fixed on the drive shaft 78 and allows free rotation of the impeller 80 from water pressure on the impeller blades 82 when water enters the drive chamber 52 from the inlet tube 64. The impeller 80 has a sun gear 86 which meshes with two planet gears 88 and 90 which are mounted on two diametrically opposed shafts 92 and 94 on a carrier disk 96. The carrier disk 96 has a center hole 98 which allows it to rotate on the shaft 78 in the drive half 54. The drive half 54 has an interior surface 100 which has a series of longitudinal teeth 102 which mesh with the planetary gears 88 and 90. The planet gears 88 and 90 cause a rotation reduction by being intermeshed between the longitudinal teeth 102 and the sun gear 86, causing the carrier disk 96 to rotate. A sun gear 106 is mounted on the opposite side of the carrier disk 96 opposite the planet gears 88 and 90.

The sun gear 106 meshes with two planet gears 108 and 110 which are mounted on two diametrically opposed shafts 112 and 114 on a carrier disk 116. The carrier disk 116 has a center hole 118 which allows it to rotate on the shaft 78 in the drive half 54. The teeth of the planet gears 108 and 110 mesh with the longitudinal teeth 102 and cause the carrier disk 116 to rotate, resulting in rotation reduction from the sun gear 106. A sun gear 120 is mounted on the opposite side of the carrier disk 116 from the planet gears 112 and 114.

The sun gear 120 meshes with two planet gears 122 and 124 which are mounted on two diametrically opposed shafts 126 and 128 on a carrier disk 130. The carrier disk 130 has a center hole 132 which allows it to rotate on the shaft 78 in the drive half 54. The teeth of the planet gears 122 and 124 mesh with the longitudinal teeth 102 and cause the carrier disk 130 to rotate, resulting in rotation reduction. A sun gear 134 is mounted on the opposite side of the carrier disk 130 from the planet gears 122 and 124.

The sun gear 134 meshes with two planet gears 136 and 138 which are mounted on two diametrically opposed shafts 140 and 142 on a carrier disk 144. The planet gears 136 and 138 mesh with planet gears 146 and 148 respectively which are mounted on diametrically opposed shafts 150 and 152 on the carrier disk 144. The carrier disk 144 has a center hole 154 which allows it to rotate on the shaft 78 in the drive half 54. The teeth of the planet gears 146 and 148 mesh with the longitudinal teeth 102 and cause the carrier disk 144 to rotate resulting in rotation reduction. A sun gear 156 is mounted on the opposite side of the carrier disk 144 from the planet gears 136, 139, 146 and 148.

The sun gear 156 meshes with two planet gears 158 and 160 which are mounted on two diametrically opposed shafts 162 and 164 on a final carrier disk 166. The teeth of the planet gears 158 and 160 mesh with the longitudinal teeth 102 and cause the final carrier disk 166 to rotate, resulting in rotation reduction.

The final carrier disk 166 has a collar 168 on the opposite side from the planet gears 158 and 160. The collar 168 has a pair of slots 170 and 172 which are coupled to the drive shaft 78 via a pin 174 which is inserted through the drive shaft 78 and the slots 170 and 172. The shaft 78 rotates with the final carrier disk 166. The shaft 78 has a bearing 176 which is coupled to the rear wheel 14. An O-ring 178 provides a water tight seal for the bearing 166 and another O-ring 180 provides a water tight seal for the drive chamber 52. The combination of gearing provides gear reduction from the rotation of the impeller 80 to the rotation of the rear wheel 14. This causes the rear wheel 14 to rotate at a 3,284 to 1 ratio to the impeller 80 in this example. Of course other reduction ratios may be achieved with different numbers of planet gears and carrier disks or different gear teeth pitch.

The other drive housing 56 has a closed end 182 with a shaft hole 184. The shaft hole 184 allows the shaft 78 to be joined to the rear wheel 16 via a bearing 186 which is sealed by an O-ring 188. The rear wheel 16 has a hub 190 to lock the rear wheel 16 on the shaft 78. The rear wheel 16 is thus driven by the shaft 78.

The front end 22 has a bumper 200. The bumper 200 has a wide front surface 202 and a top surface 204 with a slot 206. The slot 206 is joined to a pin 208 on the interior of the body 12. The slot 206 and pin 208 allow the bumper 200 to slide the length of the slot 206. The bumper 200 has a rear arm 210 which is coupled to a valve clevis 212. The valve clevis 212 has a slot 214 which fits the rear arm 210. A pin 216 is inserted through a mounting hole 218 to attach the valve clevis 212 to the rear arm 210. The other end of the valve clevis 212 is installed in a cylindrical valve guide 220. The valve guide 220 provides a hollow interior surface 222 which holds the valve clevis 212 and provides a watertight fit via an O-ring 224. The opposite end of the valve guide 220 has an annular collar 226 which has a circular orifice 228. A valve spool 230 has a cylindrical end installed through the circular orifice 228 and is connected to the valve clevis 212. The opposite end of the valve spool 230 has a circular platter valve 232.

The outlet 66 is coupled to an outlet adapter 234 which has a cylindrical main body 236. The bottom of the main body 236 has a connection tube 238 which is inserted in the outlet 66. The top of the main body 236 has an outlet tube 240 which is offset from the connection tube 238. The outlet tube 240 has a threaded interior surface 242 and inserted in a socket 244 on the top surface 32 of the sprinkler body 10.

A valve seat 250 is located in the main body 236 between the connection tube 238 and the outlet tube 240. An O-ring 252 provides a water tight seal between the platter valve 232 and the valve seat 250. The valve 232 and the valve spool 230 may thus be moved to cutoff water flow to the outlet tube 240.

The water flow is cutoff to the sprinkler unit 10 when the bumper 200 contacts an object. This causes the bumper 200 to move backwards, which causes the arm 210 to push the valve clevis 212 through the valve guide 220 causing the valve spool 230 to push the platter valve 232 into the valve seat 250. Water pressure from the drive chamber 50 then pushes on the opposite side of the platter valve 232 which seals the valve 232 against the valve seat 250 to insure the valve stays closed. Water flow is interrupted from the outlet tube 66 and thus water pressure will equalize stopping force on the impeller 80 thus stopping rotational movement of the wheels 14 and 16. In order to continue operation, a user merely has to pull the bumper 200 forward removing the platter valve 232 from the valve seat 250 and water pressure resumes as water flows through the drive unit 50.

The outlet tube 240 provides a socket with female threads which may be used to connect any type of irrigation head with a male connector such as the impact type sprinkler head 30. Of course, any connectors may be used for installation of a sprinkler head. In the traveler 10 shown in FIG. 1, an impact type sprinkler head is used which sprays water in rapid bursts and may be set to rotate a fixed number of degrees. Thus, a certain non-circular pattern is irrigated which may be adjusted in terms of throw and degrees of rotation.

Figure 5A:
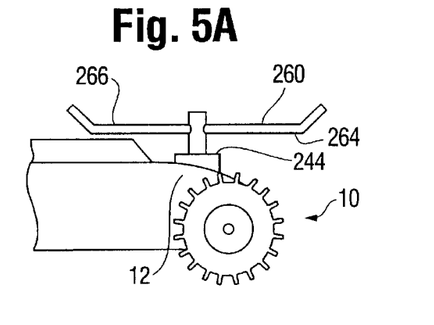
FIG. 5A–5F are close up perspective views of different sprinkler heads which are installed on the traveling sprinkler of FIG. 1.

FIGS. 5A–5F are close up views of different sprinkler heads being mounted to the traveler 10. In FIGS. 5A–5F identical elements have like element numbers to FIGS. 1–4. FIG. 5A is a close up view of a rotating sprinkler head 260 which may be mounted instead of the impact type sprinkler head. The rotating sprinkler head 260 is screwed into the threads of the socket 244. The rotating sprinkler head 260 has a pair of arms 264 and 266 which have outlets at their ends. The water pressure from the socket 244 rotates the arms 264 and 266 as water exits the arms.

Figure 5B:
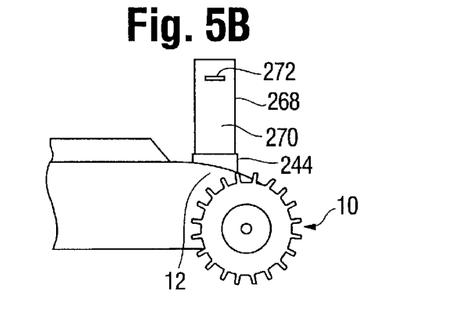

FIG. 5B is a close up view of another rotating sprinkler head 268 which may be mounted on the traveler 10 via the socket 244. The rotating sprinkler head 268 has a cylindrical body 270 with an outlet 272 which throws water at a trajectory angle. Internal water driven gearing in the cylindrical body 270 permits the outlet 272 to be oscillated at different angles. For example the gearing may be set for a full 360 degrees of coverage, 180 degrees of coverage, 90 degrees of coverage etc.

Figure 5C:
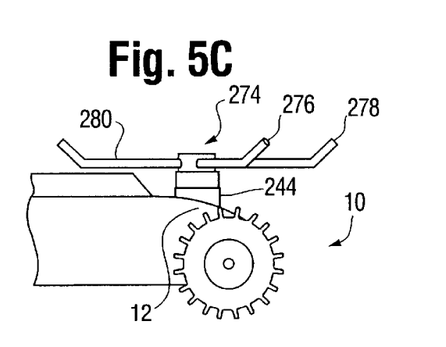

FIG. 5C is a close up view of a triple armed rotating sprinkler head 274 mounted in the socket 244 or the traveler 10. The sprinkler head 274 has three arms 276, 278 and 280 which have outlets at their ends. Water pressure through the arms 276, 278 and 280 will rotate the arms 276, 278 and 280 distributing the water at even intervals.

Figure 5D:
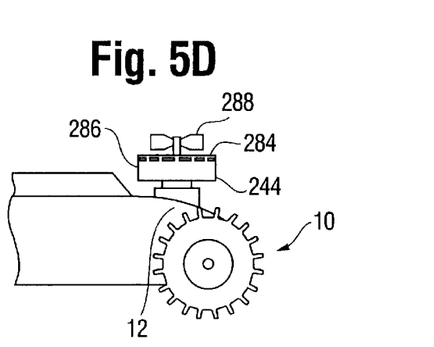
Figure 5E:
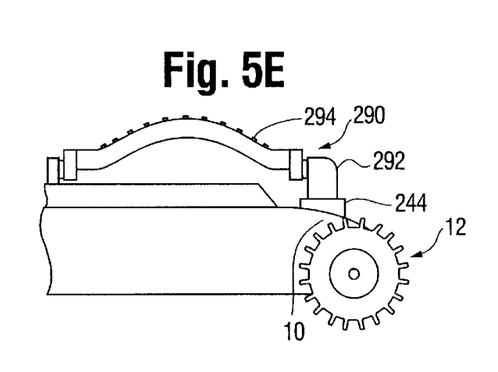

FIG. 5D is a close up view of a whirling sprinkler head 282. The sprinkler head 282 has a water chamber 284 with a conical top 286. The top 286 has a number of water outlets. The center of the top 286 has a propeller 288 which rotates to deflect the water from the outlets into a square pattern.

The types of sprinkler heads are not limited to those which rotate. Any appropriate sprinkler type which may be coupled to the socket 244 may be used. For example, in FIG. 5E, an oscillating sprinkler 290 is shown. The oscillating sprinkler 290 has an elbow connector 292 which is coupled to the socket 244. The elbow connector 292 provides water to drive internal gearing to drive a rotating tube 294. The tube 294 has a series of water outlets which issue forth water streams. The tube 294 rotates providing water in a desired pattern.

Figure 5F:
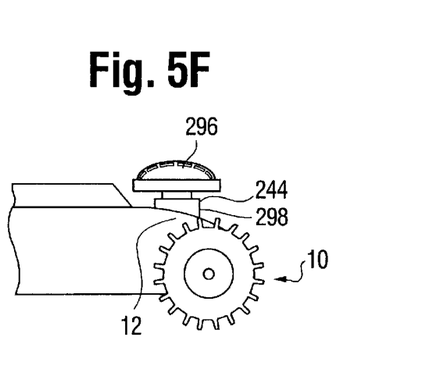

Another example is a fixed pattern sprinkler 296 shown in FIG. 5F. The fixed pattern sprinkler 296 has a coupler 298 which is connected to the socket 244. The fixed pattern sprinkler 296 has a number of water outlets which permit watering in a specific pattern from the body of the fixed pattern sprinkler 296.

The operation of the traveling sprinkler 10 is accomplished by coupling the hose 28 to the coupler 26. Although the sprinkler 10 generally moves forward in a line, the front wheels 18 and 20 may be rotated on the clevis 34 to move the sprinkler 10 in a circular pattern. The radius of the circular pattern depends on the angle to which the clevis 34 is rotated. The wide tracks of the rear wheels 14 and 16 in conjunction with the nubs 46 assist in providing traction on the path of the sprinkler 10. The sprinkler 10 is placed in alignment with the area to be watered. A user may install whatever sprinkler head in the socket 244 which is desired. In certain configurations; it may be desired to use asymmetrical watering patterns such as that issued from the oscillating sprinkler 290 in FIG. 5E or the fixed pattern sprinkler in FIG. 5F.

Once the water is turned on, the water is pressurized in the hose 28 and enters the drive chamber 52 of the drive unit 50. The pressurized water comes through the inlet tube 64 and turns the impeller 80 by impacting the blades 82. The impeller 80 turns the sun gear 86 at a high rotation rate. The series of carriers 96, 116, 130, 144 and 166 result in rotation reduction. The shaft 78 is coupled to the final carrier 166 and thus turns the rear wheel 14 and 16 to propel the sprinkler 10 slowly forward. The water exits the drive chamber 52 via the outlet 66. The water is forced into the outlet adapter 234 and drives the sprinkler head 30. The water pressure drives the sprinkler head 30 resulting in the distribution of water according to the mechanics of the sprinkler head 30.

Figure 6:
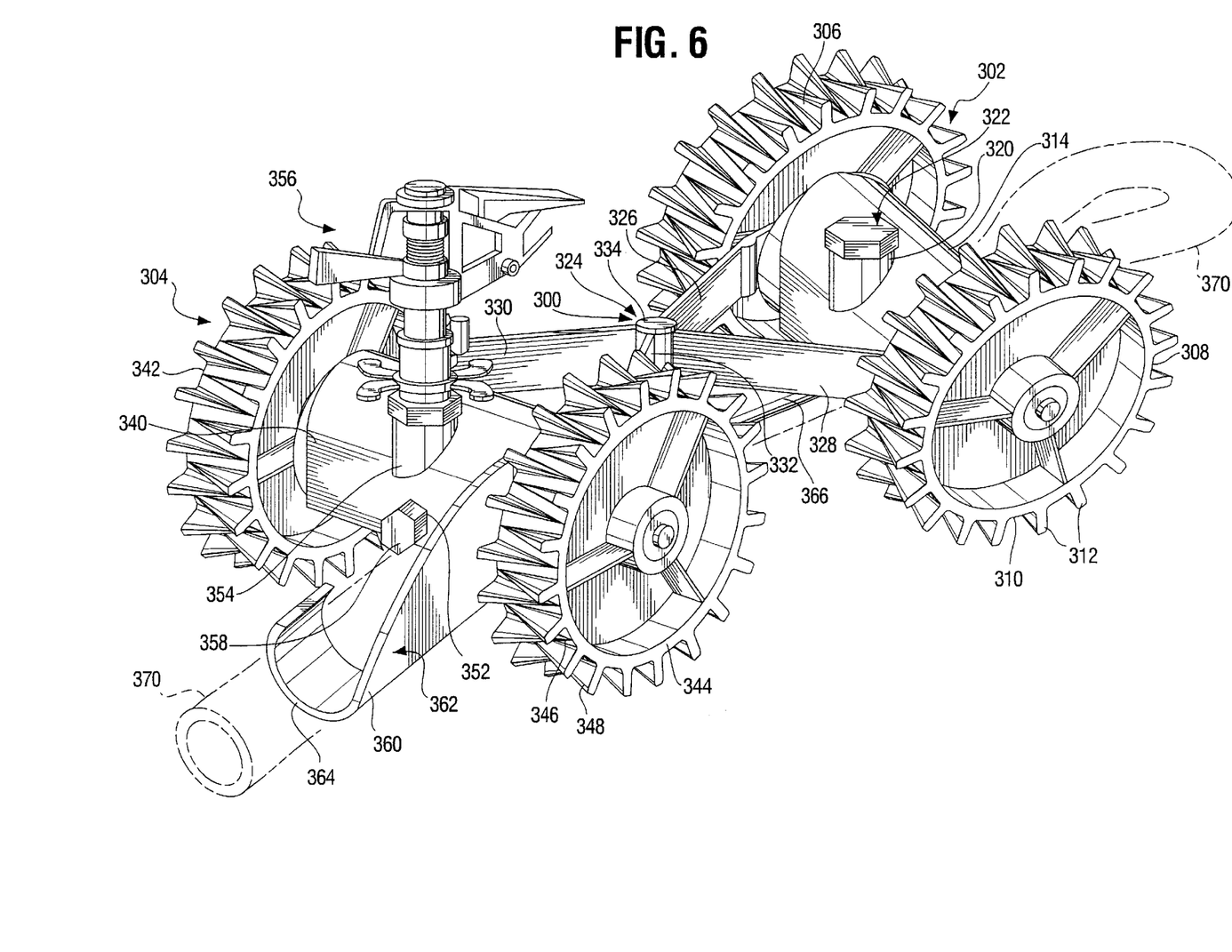
FIG. 6 is a perspective view of a traveling sprinkler according to another embodiment of the present invention.
Figure 7:
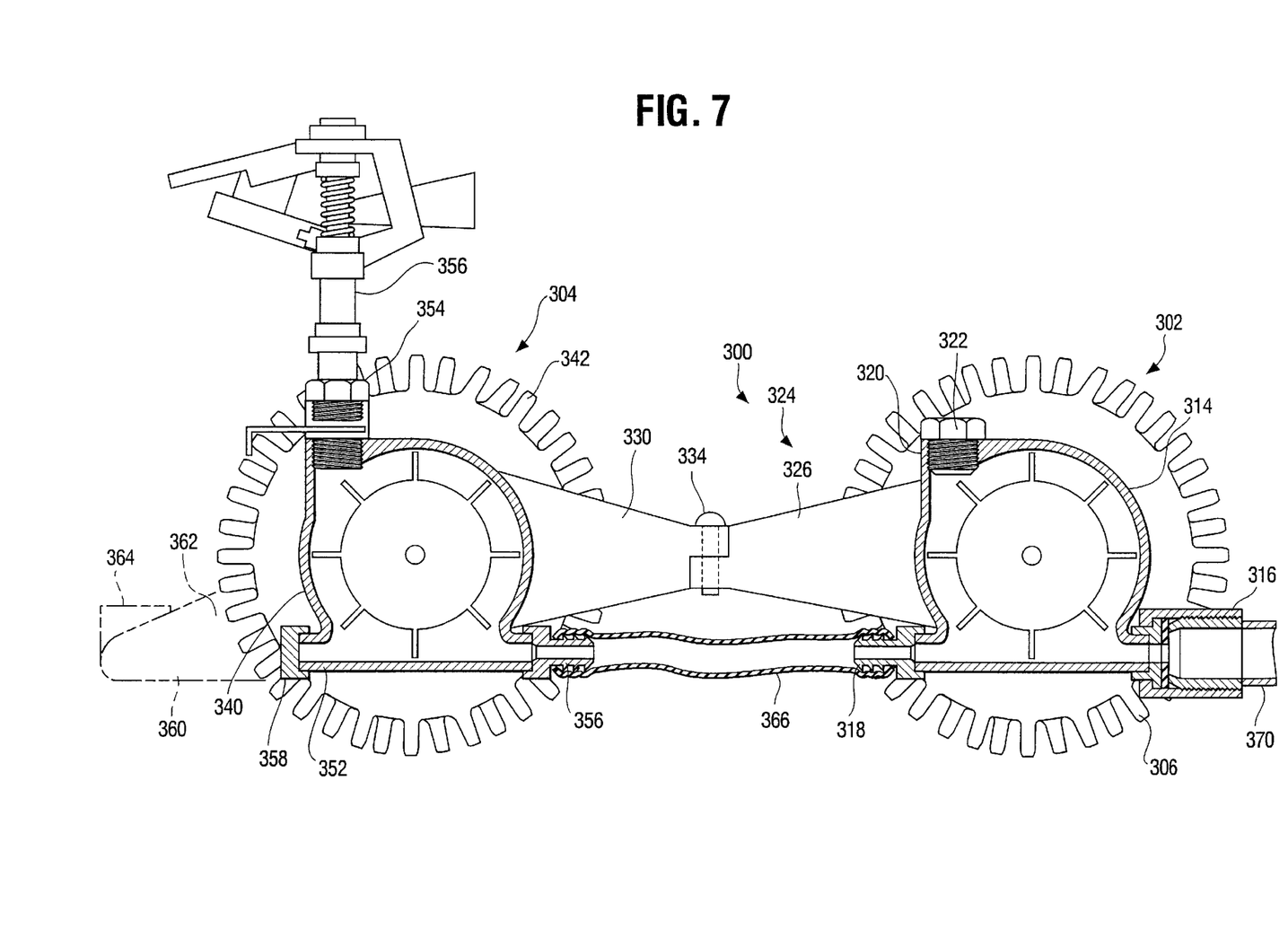
FIG. 7 is a cutaway view of the traveling sprinkler in FIG. 6

The motor drive 50 in FIGS. 1–4 may be applied to other sprinkler configurations. For example, FIGS. 6 and 7 show a modular traveling sprinkler 300. The traveling sprinkler 300 has a rear unit 302 and a front unit 304. The rear unit 302 has a pair of wheels 306 and 308. The wheels 306 and 308 have a wide track area 310 with nubs 312 to assist in traction. The rear wheels 306 and 308 are coupled to a drive unit 314 which is similar to the drive unit 50 in FIGS. 1–4. The drive unit 314 has a hose coupler 316 which allows a hose to be coupled for high pressure water to be fed into the drive unit 314. The drive unit 314 also has an outlet hose coupler 318 which allows water to flow out of the unit. A sprayer head port 320 is mounted at the top of the drive unit 314. The sprayer head port 320 allows the mounting of any irrigation device with a common coupler as shown in FIGS. 5A–5F. In this example, the sprayer head port 320 has a plug 322 which prevents water from flowing from the sprayer head port 320.

The rear unit 302 and the front unit 304 are joined by a chassis 324. The chassis 324 has a pair of rear forks 326 and 328 which are connected to the rear unit 302. The chassis 324 has a pair of forward forks 330 and 332 which are connected to the front unit 304. The forks 326, 328, 330 and 332 are connected to a central pivot 334 which allows the rear unit 302 and forks 326 and 328 to pivot and the front unit 304 and forks 330 and 332 to pivot.

The front unit 304 is identical to the rear unit 302. The front unit 304 has a drive unit 340 and a pair of front wheels 342 and 344. The front wheels 342 and 344 are identical components to the rear wheels 306 and 308 and have a wide track area 346 with nubs 348 for traction. The drive unit 340 has an inlet coupler 350 which allows high pressure water to be fed into the drive unit 340. The drive unit 340 also has an outlet hose coupler 352 which allows water to flow out of the drive unit 340. A sprayer head port 354 is mounted at the top of the drive unit 340. The sprayer head port 354 allows the mounting of any irrigation device with a common coupler as shown in FIGS. 5A–5F. In this example, the sprayer head port 354 has an impact sprinkler head 356. The outlet coupler 352 allows fluid connection to another drive unit, in this example, a plug 358 is installed in the outlet coupler 352 to prevent further water flow.

The drive unit 340 has a hose guide 360 which is mounted to extend from the front of the front unit 304. The hose guide 360 is attached to the drive unit 340 by screws. It is to be understood that other connection mechanisms such as bolts, welding etc. may be used. The guide may also be a set of small wheels that track a hose, a wire form which is captured by the hose, an integral extension of the motor housing, etc. or any other mechanism which may be easily placed on the hose.

The hose guide 360 has an arm 362 which extends laterally from the drive unit 340. The end of the arm 362 has a semi cylindrical catcher 364 which can accommodate different diameter hoses. An umbilical hose 366 is coupled between the inlet hose coupler 350 of the drive unit 340 and the outlet coupler 318 of the drive unit 314 to provide water flow between the drive units 314 and 340. Both the front and rear drive units 314 and 340 have an internal configuration identical to that of the drive unit 50 in FIGS. 1–4. Thus, the drive units 314 and 340 have an impeller which is propelled by pressurized water entering the drive chamber. The impeller is connected to reduction gearing to propel the wheels. As may be appreciated, since the drive units 314 and 340 are identical, they may be interchanged with each other. Additionally, any configuration of sprinkler heads may be used in conjunction with the combination of drive units and the chassis 324.

In operation, the traveling sprinkler 300 is set to follow a hose 370 which is laid out in the desired watering pattern. The hose 370 has one end which is coupled to a sillcock which provides high pressure water. The hose 370 is threaded through the catcher 364 of the hose guide 360 on the front unit 304. The other end of the hose 370 is then coupled to the hose coupler 316 of the rear unit 314. When the water is turned on in the hose 370, the drive units 314 and 340 propel the wheels 306, 308, 344 and 348 and move the sprinkler 300 forward. By following the hose 370, the hose guide 360 steers the sprinkler 300 to the desired pattern in the area which should be irrigated.

Figure 8:
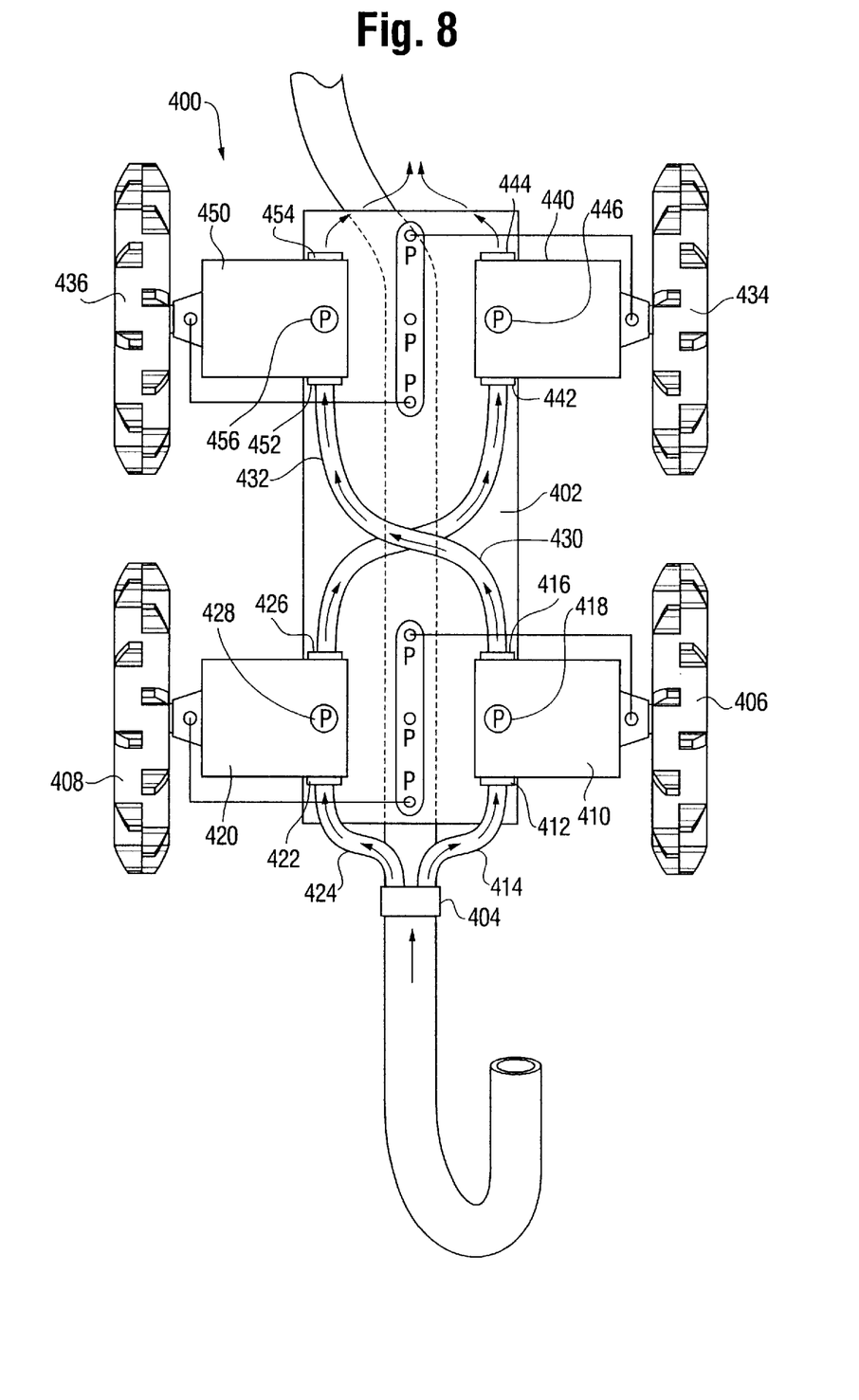
FIG. 8 is a top view of another embodiment of the present invention.

Since the driver units are modular in nature, traveling sprinklers with additional driver units may be made. FIG. 8 shows another modular traveling sprinkler 400. The traveling sprinkler 400 has a chassis 402 which has a hose coupler 404. The hose coupler 404 allows connection of a hose. A pair of rear wheels 406 and 408 support the chassis 402. The rear wheel 406 is coupled to a drive unit 410 which is similar to the drive unit 50 in FIGS. 1–4. The drive unit 410 has an inlet coupler 412 which is connected to a hose segment 414 which is connected to the hose coupler 404. The hose segment 414 provides high pressure water to the drive unit 410. The drive unit 410 also has an outlet hose coupler 416 which allows water to flow out of the drive unit 410 after driving the impeller (not shown). Unlike the drive unit 50 described in FIGS. 1–4, the drive unit 410 only drives the single rear wheel 406. The opposite end of the drive unit 410 from the rear wheel 406 is enclosed. A sprayer head port 418 is mounted at the top of the drive unit 410. The sprayer head port 410 allows the mounting of any irrigation device with a common coupler as shown in FIGS. 5A–5F.

Similarly, the rear wheel 408 is coupled to a drive unit 420 which is identical and interchangeable with the drive unit 410 described above. The drive unit 420 has an inlet 422 which is connected to a hose segment 424. The hose segment 424 is connected to the hose coupler 404 and provides high pressure water to the drive unit 420. The drive unit 420 also has an outlet hose coupler 426 which allows water to flow out of the drive unit 420 after driving the impeller (not shown). A sprayer head port 428 is mounted at the top of the drive unit 420. The sprayer head port 428 allows the mounting of any irrigation device with a common coupler as shown in FIGS. 5A–5F. The outlet hose coupler 416 is fluidly coupled to a flexible connector 430 while the outlet hose coupler 426 is coupled to a flexible connector 432.

The chassis 402 is also supported by a pair of front wheels 434 and 436. The front wheel 434 is coupled to a drive unit 440 which is identical and interchangeable with the drive unit 410 described above. The drive unit 440 has an inlet 442 which is connected to the other end of the flexible connector 432. The flexible connector 432 provides fluid connection from the drive unit 420 to the drive unit 440. The drive unit 440 also has an outlet hose coupler 444 which allows water to flow out of the drive unit 440 after driving the impeller (not shown). The outlet hose coupler 444 may be used to connect other drive modules or other water driven devices. In this example, the outlet hose coupler 444 is plugged. A sprayer head port 446 is mounted at the top of the drive unit 440. The sprayer head port 446 allows the mounting of any irrigation device with a common coupler as shown in FIGS. 5A–5F.

Similarly, the front wheel 436 is coupled to a drive unit 450 which is identical and interchangeable with the drive unit 410 described above. The drive unit 450 has an inlet 452 which is connected to the flexible connector 430. The inlet 452 provides high pressure water from the drive unit 410 to the drive unit 450. The drive unit 450 also has an outlet hose coupler 454 which allows water to flow out of the drive unit 450 after driving the impeller (not shown). In this example, the outlet hose coupler 454 is plugged. A sprayer head port 456 is mounted at the top of the drive unit 450. The sprayer head port 456 allows the mounting of any irrigation device with a common coupler as shown in FIGS. 5A–5F.

In operation, a hose is coupled to the hose coupler 404. The hose is then laid out in the desired pattern that the sprinkler 400 is desired to travel. Water is then sent into the hose. The water enters the drive units 410 and 420 and drives the rear wheels 406 and 408. The water also continues through and enters the drive units 450 and 440 to drive the front wheels 434 and 436. Each of the drive units 410, 420, 440 and 450 may mount sprinkler heads on their respective ports 418, 428, 448 or 458.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A self propelled sprinkler unit for irrigation of a ground area and connection with a hose connected to a pressurized water source, the sprinkler unit comprising:
   a drive unit having a hose inlet with a hose coupler, the drive unit having a drive chamber with a rotatable impeller in fluid contact with the water flow from the hose inlet;
   a shaft mechanically coupled to the impeller via a reduction gearing system contained within the drive chamber;
   a pair of rear wheels which contact the ground area and support the sprinkler unit, at least one rear wheel coupled to the shaft;
   an outlet coupler in fluid communication with the drive unit;
   a sprinkler head mounted on the outlet coupler; and
   wherein the reduction gearing system further includes:
     a sun gear coupled to the impeller in coaxial relation with the shaft;
     a carrier disk rotatable mounted on the shaft, the carrier disk having one surface with a planet gear mounted on a radial shaft; and
     wherein the interior surface of the drive chamber has gear teeth and the planet gear meshes with the sun gear and the interior of the drive chamber for rotational reduction of the impeller.

2. The sprinkler unit of claim 1 further comprising:
   a support body having a front end and a rear end connected to the drive unit; and
   a front wheel mounted to the front end.

3. The sprinkler unit of claim 2 wherein the front wheel is mounted on a forked rotating clevis, the clevis being mounted on the front end of the support body.

4. The sprinkler unit of claim 1 further comprising:
   a second sun gear coupled to an opposite surface of the carrier disk in coaxial relation with the shaft;
   a second carrier disk rotatably mounted on the shaft, the second carrier disk having one surface with a planet gear mounted on a radial shaft, the planet gear meshing with the second sun gear and the interior of the drive chamber for rotational reduction of the impeller and the first carrier disk.

5. The sprinkler unit of claim 1 wherein the rear wheels have a large track area with nubs mounted on the tracks.

6. The sprinkler unit of claim 1 wherein the hose coupler has a hose adapter with an interior surface with female threads.

7. The sprinkler unit of claim 1 wherein the hose coupler is a snap on connector.

8. The self-propelled sprinkler unit of claim 1 wherein the sprinkler head is an impact type sprinkler head.

9. The self-propelled sprinkler unit of claim 1 wherein the sprinkler head includes a pair of rotating arms.

10. A self propelled sprinkler unit for irrigation of a ground area and connection with a hose connected to a pressurized water source, the sprinkler unit comprising:
    a drive unit having a hose inlet with a hose coupler, the drive unit having a drive chamber with a rotatable impeller in fluid contact with the water flow from the hose inlet;
    a shaft mechanically coupled to the impeller;
    a pair of rear wheels, at least one rear wheel coupled to the shaft;
    an outlet coupler in fluid communication with the drive unit;
    a sprinkler head mounted on the outlet coupler;
    a support body having a front end and a rear end connected to the drive unit;
    a front wheel mounted to the front end;
    an adaptor coupled to the outlet, the adaptor having a port for fluid communication with the outlet, and a socket for the insertion of the sprinkler;
    a bumper transversely mounted on the support body to move between a forward position and a rearward position, the bumper having an arm; and
    a plunger valve in the adaptor and coupled to the arm, such that when the bumper is in the rearward position, the plunger valve cuts off water flow between the outlet and the socket.

11. A self propelled sprinkler unit for irrigation of a ground area and connection with a hose connected to a pressurized water source, the sprinkler unit comprising:
    a drive unit having a hose inlet with a hose coupler, the drive unit having a drive chamber with a rotatable impeller in fluid contact with the water flow from the hose inlet;
    a shaft mechanically coupled to the impeller;
    a pair of rear wheels, at least one rear wheel coupled to the shaft;
    an outlet coupler in fluid communication with the drive unit;
    a sprinkler head mounted on the outlet coupler; and
    a hose guide coupled to the front end of the body, the hose guide capable of directing a hose for guiding the drive unit.

12. The sprinkler unit of claim 11 further comprising:
    a second drive unit having a hose inlet with a hose coupler, the drive unit having a drive chamber with a rotatable impeller in fluid contact with the water flow from the hose inlet;
    a shaft mechanically coupled to the impeller;
    a pair of front wheels, at least one front wheel coupled to the shaft;
    an outlet coupler in fluid communication with the drive unit; and
    a chassis having a pair of front arms coupled to the first drive unit and a pair of front arms coupled to the second drive unit, the rear and front arms attached to a pivot to allow pivoting of the front and rear wheels relative to each other.

13. A water propelled drive unit for a self propelled sprinkler with a hose coupled to a water source, the drive unit comprising:
- an enclosed drive chamber in a cylindrical shape with two relatively flat ends, an outer surface, and an inner surface;
- an inlet coupler on the exterior surface of the drive chamber allowing fluid communication to the drive chamber;
- a shaft mounted between the two flat ends;
- a wheel which supports the sprinkler and is in contact with the ground, the wheel coupled to the shaft;
- a rotatable impeller mounted axially on the shaft in the drive chamber, the impeller in fluid contact with the inlet coupler and in mechanical relation with the shaft via a reduction gearing system contained within the drive chamber;
- an outlet coupler on the exterior surface of the drive chamber
- a carrier disk rotatable on the shaft having one side with a pair of diametrically opposed shafts and an opposite side with a sun gear mounted coaxially with the shaft, the carrier disk in mechanical connection with the shaft;
- a pair of planet gears mounted on the diametrically opposed shafts;
- a sun gear coaxially mounted on the impeller; and
- wherein the inner surface of the drive chamber has gear teeth and the planet gears intermesh with the gear teeth of the inner surface of the drive chamber and the sun gear.

14. The drive unit of claim 13 wherein the inlet coupler has a hose coupler.

15. The drive unit of claim 14 wherein the hose coupler is a female hose coupler having a cylinder with interior threads.

16. The drive unit of claim 14 wherein the hose coupler is a snap on connector.

17. The drive unit of claim 13 further comprising a sprinkler head fluidly coupled to the outlet coupler.

18. The sprinkler unit of claim 13 wherein the wheels have a large track area with nubs mounted on the tracks.

19. A water propelled drive unit for a self propelled sprinkler with a hose coupled to a water source, the drive unit comprising:
- an enclosed drive chamber in a cylindrical shape with two relatively flat ends, an outer surface, and an inner surface;
- an inlet coupler on the exterior surface of the drive chamber allowing fluid communication to the drive chamber;
- a shaft mounted between the two flat ends;
- a rotatable impeller mounted axially on the shaft in the drive chamber, the impeller in fluid contact with the inlet coupler and in mechanical relation with the shaft;
- an outlet coupler on the exterior surface of the drive chamber;
- a pair of wheels coupled to the shaft;
- a carrier disk rotatable on the shaft having one side with a pair of diametrically opposed shafts and an opposite side with a sun gear mounted coaxially with the shaft, the carrier disk in mechanical connection with the shaft;
- a pair of planet gears mounted on the diametrically opposed shafts;
- a sun gear coaxially mounted on the impeller;
- wherein the inner surface of the drive chamber has gear teeth and the planet gears intermesh with the gear teeth of the inner surface of the drive chamber and the sun gear;
- a second carrier disk rotatable on the shaft having one side with a pair of diametrically opposed shafts and an opposite side with a second sun gear mounted coaxially with the shaft, the carrier disk in mechanical connection with the shaft;
- a second pair of planet gears mounted on the diametrically opposed shafts; and
- wherein the second pair of planet gears intermesh with the gear teeth of the inner surface of the drive chamber and the second sun gear.

* * * * *